United States Patent [19]

Kondo

[11] Patent Number: 5,739,940
[45] Date of Patent: Apr. 14, 1998

[54] MULTI-BEAM SCANNING OPTICAL DEVICE WITH A CHROMATIC ABERRATION CANCELLATION FEATURE

[75] Inventor: Kazuyuki Kondo, Kawasaki, Japan

[73] Assignee: Canon Kabushiki Kaisha, Tokyo, Japan

[21] Appl. No.: 727,232

[22] Filed: Oct. 8, 1996

[30] Foreign Application Priority Data

Oct. 11, 1995 [JP] Japan .................................. 7-289234

[51] Int. Cl.$^6$ .................................................. G02B 26/08
[52] U.S. Cl. ................................................ 359/204; 359/216
[58] Field of Search ................................ 359/204–207, 359/212–219, 16–19, 565, 566, 569, 571, 573–575, 741–743; 347/233, 243, 244

[56] References Cited

U.S. PATENT DOCUMENTS

| | | |
|---|---|---|
| 4,435,041 | 3/1984 | Torok et al. ........................ 359/573 |
| 4,774,542 | 9/1988 | Kondo . |
| 4,894,682 | 1/1990 | Kondo et al. . |

Primary Examiner—James Phan
Attorney, Agent, or Firm—Fitzpatrick, Cella, Harper & Scinto

[57] ABSTRACT

A high-performance, low-cost multi-beam scanning optical device prevents picture quality from being degraded owing to the chromatic aberration of a cylindrical lens and an image formation lens system. In this multi-beam scanning optical device, a synthetic beam $L_0$ is synthesized by a beam synthesizer from laser light beams $L_1$ and $L_2$, which are respectively generated by different semiconductor lasers and are different in wavelength from each other. The synthetic beam is then deflected and used for scanning. Subsequently, the synthetic beam is led through an image formation lens system to a beam splitter whereupon the synthetic beam is split into scanning light beams $L_3$ and $L_4$. Thereafter, images are formed from the scanning light beams $L_3$ and $L_4$ on a light-sensitive drum that serves as a recording medium. Further, degradation in picture quality due to the chromatic aberration is prevented by providing a grating lens, which is operative to offset or cancel out the chromatic aberration of lenses of the image formation lens system, in an optical path of the synthetic beam.

8 Claims, 4 Drawing Sheets

MULTI-BEAM SCANNING OPTICAL DEVICE WITH A CHROMATIC ABERRATION CANCELLATION FEATURE

BACKGROUND OF THE INVENTION

1. Field of the Invention

The present invention relates to a multi-beam scanning optical device for use in an image forming apparatus such as a multicolor digital copier (or copying machine) and a multicolor laser printer.

2. Description of the Related Art

As shown in FIG. 1(a) and 1(b), a multi-beam scanning optical device for use in an image forming apparatus, such as a multicolor digital copier and a multicolor laser printer, is generally provided with a multi-beam scanning optical system that comprises: first and second semiconductor lasers 101 and 102, which are operative to generate laser light beams $N_1$, whose wavelength is 670 nm, and laser light beams $N_2$, whose wavelength is 780 nm, respectively; collimator lenses 101a and 102a, which are operative to collimate the laser light beams $N_1$ and laser light beams $N_2$, respectively (namely, convert the laser light beams $N_1$ into parallel beams and similarly convert laser light beams $N_2$ into parallel beams); a beam synthesizer 103, which is operative to synthesize and generate a single synthetic beam $N_0$ from collimated laser light beams $N_1$ and $N_2$; a cylindrical lens 103a, which is operative to condense the synthetic beam $N_0$ into a linear beam on a reflection surface 104a of a rotating polygon mirror 104; and an image formation lens system 106 that is operative to form an image of the synthetic beam $N_0$, which has been deflected and used in scanning by the polygon mirror 104, on the surface of a light-sensitive drum 105. Further, a beam splitter 107 for splitting the synthetic beam $N_0$ into a scanning light beam $N_3$, whose wavelength is 670 nm, and a scanning light beam $N_4$, whose wavelength is 780 nm, is provided between the light-sensitive drum 105 and the image formation lens system 106. The scanning light beams $N_3$ and $N_4$ obtained by the beam splitter 107 reach corresponding image (formation) points 105a and 105b on the light-sensitive drum 105 through turning mirrors 108a to 108c, respectively. Namely, the first scanning light beam $N_3$ having a wavelength of 670 nm is first transmitted by the beam splitter 107 and is then reflected by the first and second turning mirrors 108a and 108b. Subsequently, an image is formed from the first scanning light beam $N_3$ at the first image (formation) point 105a on the light-sensitive drum 105. On the other hand, the second scanning light beam $N_4$ having a wavelength of 780 nm is first reflected by the beam splitter 107 and is then reflected by the third turning mirror 108c. Subsequently, an image is formed from the second scanning light beam $N_4$ at the second image (formation) point 105b on the light-sensitive drum 105.

Electrostatic latent images are formed on the light-sensitive drum 105 from the first and second scanning light beams $N_3$ and $N_4$, which have reached the first and second image (formation) points 105a and 105b in this way, by utilizing a main (or horizontal) scanning operation, which is performed by rotating the rotating polygon mirror 104, and a subsidiary (or vertical) scanning operation, which is performed by rotating the light-sensitive drum 105, respectively. The image formation lens system 106 is provided with a spherical lens 106a and a toric lens 106b and has what is called an fθ-function, namely, the function of correcting the unevenness of the scanning speed of the synthetic beam $N_0$ and the distortion of a point image, namely, an image of a point.

A dichroic mirror, which is adapted to transmit a laser light beam having a wavelength of 670 nm and to reflect a laser light beams having a wavelength of 780 nm, is used as the beam synthesizer 103. This dichroic mirror is a multi-layer film interference filter obtained by applying a predetermined number of thin films on a substrate. Further, a dichroic mirror, which is a multi-layer film interference filter having the same optical characteristics, is used as the beam splitter 107.

However, in the case of the aforementioned prior art device, the distances from the surface of the light-sensitive drum to the image (formation) points respectively corresponding to the scanning light beams are not equal to each other owing to the chromatic (or color) aberration of each of the cylindrical lens, which is operative to condense the synthetic beam into a linear beam on the reflection surface of the rotating polygon mirror, and the lenses of the image formation lens system. When the scanning light beams have certain wavelengths, the distances therebetween largely differ from each other. This results in an extremely blurred picture. To prevent this, there has been proposed a method by which these lenses are achromatized by using a plurality of lenses (namely, a complex lens) as each of the cylindrical lens and the lenses of the image formation lens system. However, it is feared that this method complexes the image formation lens system and so on and that consequently, the cost of the multi-beam scanning optical device becomes very high.

SUMMARY OF THE INVENTION

The present invention has been conceived to solve the aforementioned outstanding problems of the prior art. It is, accordingly, an object of the present invention to provide a high-performance, low-cost multi-beam scanning optical device which can prevent picture quality from being degraded owing to the chromatic aberration of the cylindrical lens and the image formation lens system.

To achieve the foregoing object, in accordance with an aspect of the present invention, there is provided a multi-beam scanning optical system having a multi-beam scanning optical system, in which a scanning operation is performed by scanning means by using a synthetic beam consisting of a plurality of light beams having different wavelengths, and, in which the synthetic beam is split into a plurality of scanning light beams through an image formation lens system, and, in which images are formed from the plurality of scanning light beams. Further, a grating lens for offsetting or canceling out the chromatic aberration of the multi-beam scanning optical system is provided in an optical path of the synthetic beam.

Moreover, it is preferable that the grating lens is provided on an emission surface of a beam synthesizer for synthesizing the synthetic beam from the plurality of light beams.

Furthermore, it is desirable that the grating lens is provided on an emission surface of a cylindrical lens for condensing the synthetic beam onto the scanning means.

Further, it is preferable that the grating lens is an anamorphic grating lens having different focal lengths respectively corresponding to two axes which are orthogonal to each other.

Moreover, in accordance with another aspect of the present invention, there is provided a multi-beam scanning optical device that comprises: light source means for generating a plurality of light beams having different wavelengths; beam synthesizing means for synthesizing a synthetic beam from the plurality of light beams; scanning means for performing scanning by using the synthetic beam; an optical system for forming an image on a predetermined surface from the synthetic beam; and a grating lens, which is provided in an optical path of the synthetic beam, for canceling out a chromatic aberration of the optical system.

The grating lens of the present invention is obtained by providing a zonal diffraction grating on a surface of a substrate and possesses a characteristic that the focal length thereof varies with the wavelength of incident light. The (lens) chromatic aberration of the optical system consisting of the cylindrical lens, which is operative to condense the synthetic beam onto the scanning means, and the image formation lens system is offset by utilizing such a characteristic of the grating lens. Thus, the picture quality is prevented from being deteriorated owing to the chromatic aberration. As compared with the case of performing the achromatization on each of the lenses, the cost of achromatizing the optical system of the multi-beam scanning optical device of the present invention is low because the system need only have a relatively-inexpensive single grating lens. Namely, there is no fear of a steep rise in cost of parts of the multi-beam scanning optical device of the present invention.

Consequently, there can be provided a high-performance inexpensive multi-beam scanning optical device, which can prevent the picture quality from being degraded owing to the chromatic aberration of the lenses of the multi-beam scanning optical system.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1(a) is a partially schematic plan view of a primary part of the conventional multi-beam scanning optical device; and FIG. 1(b) is a partially schematic elevational view of the entire conventional multi-beam scanning optical device;

FIG. 1(a) is a partially schematic plan view of a primary part of the first embodiment; and FIG. 1(b) is a partially schematic elevational view of the entire first embodiment;

DESCRIPTION OF THE PREFERRED EMBODIMENTS

Hereinafter, the preferred embodiments of the present invention will be described in detail by referring to the accompanying drawings.

Figure 1A:
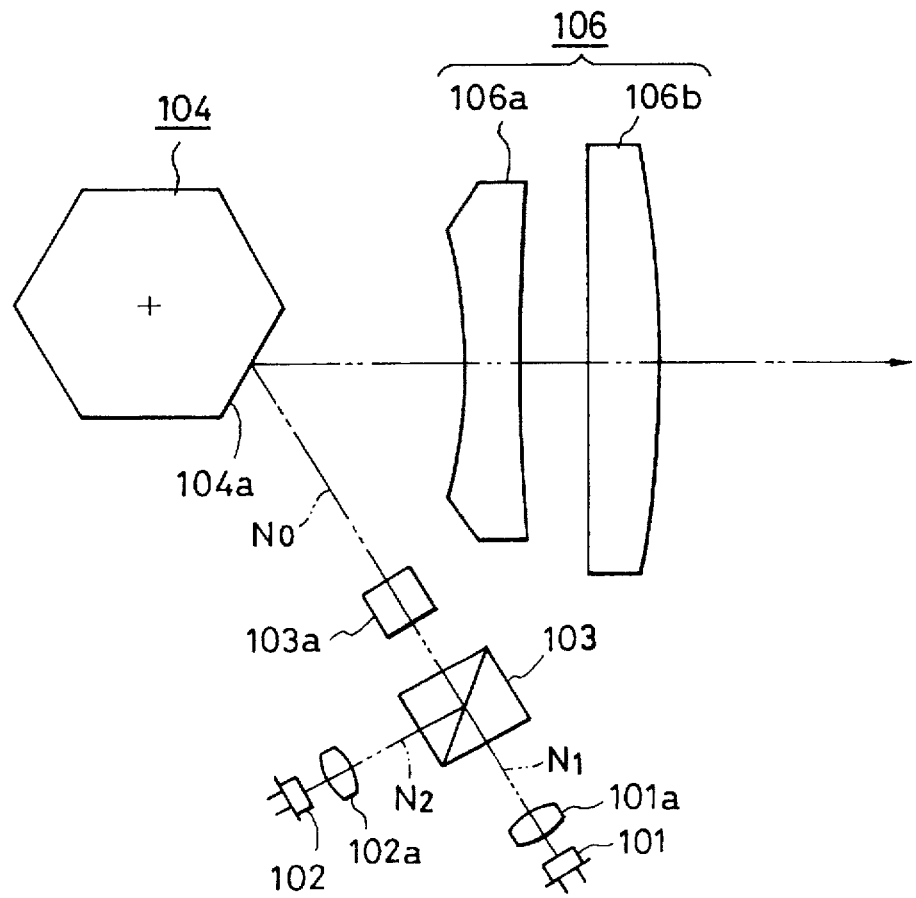
FIGS. 1(a) and 1(b) are diagrams for illustrating the conventional multi-beam scanning optical device, namely.
Figure 1B:
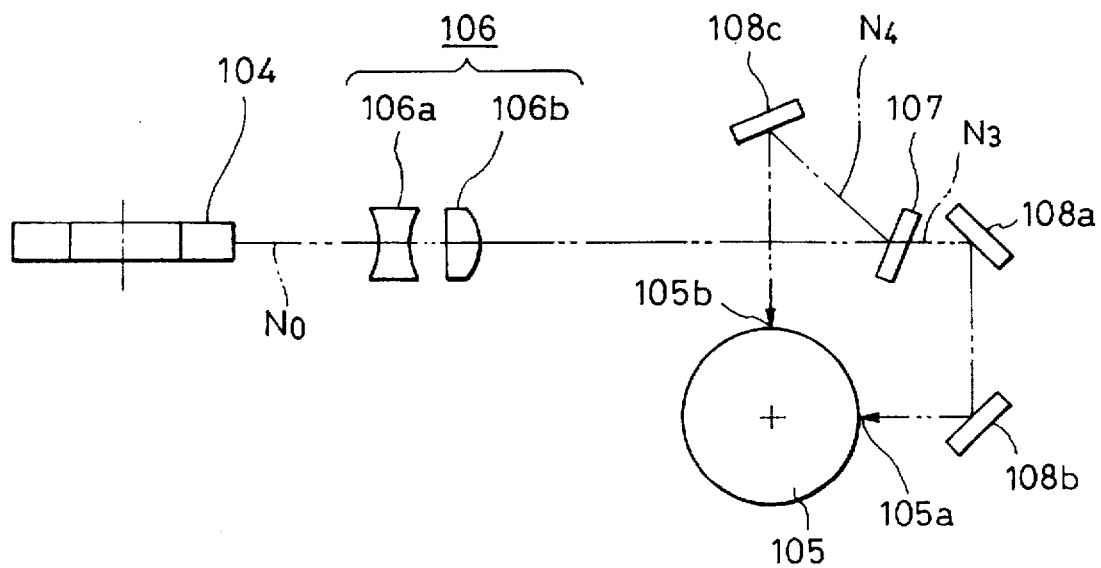
Figure 2A:
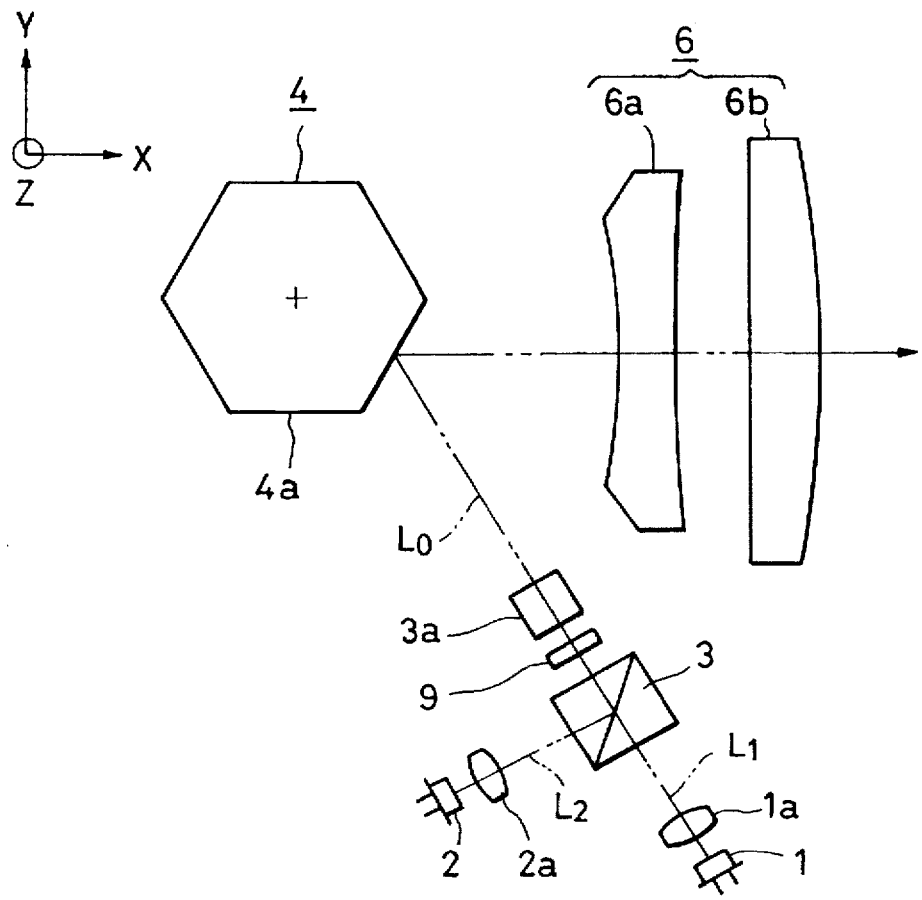
FIGS. 2(a) and 2(b) are diagrams for illustrating a multi-beam scanning optical device according to a first embodiment of the present invention, namely.
Figure 2B:
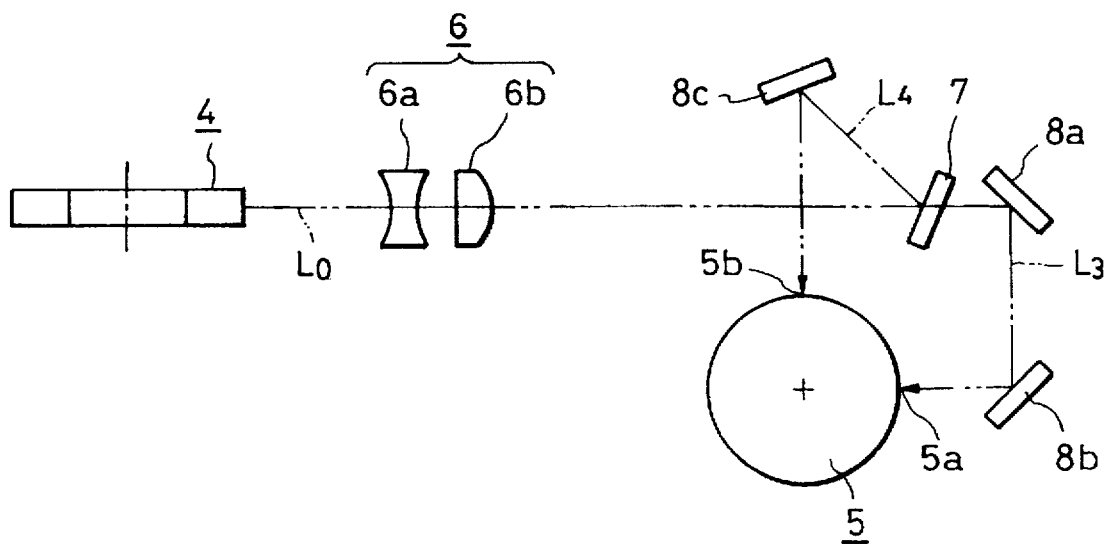
Figure 3A:
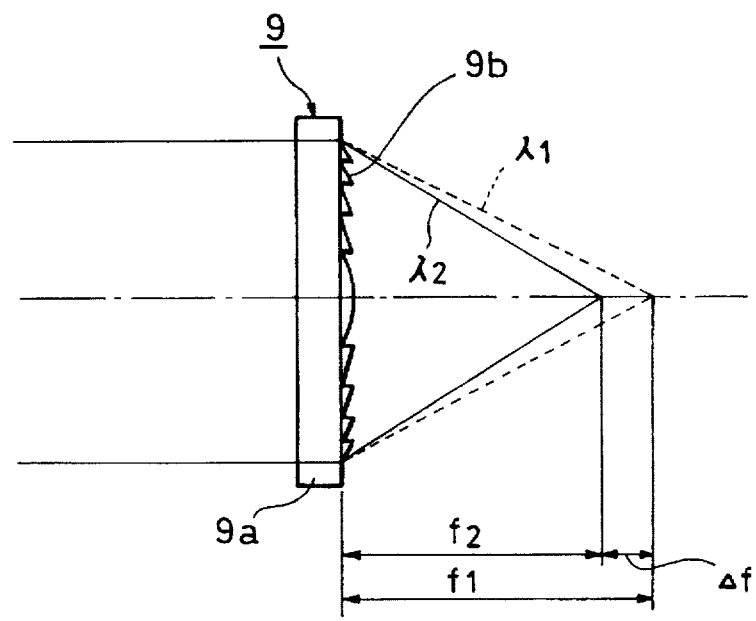
FIGS. 3(a) and 3(b) are diagrams for illustrating a grating lens used in the device of FIGS. 2(a) and 2(b)
Figure 3B:
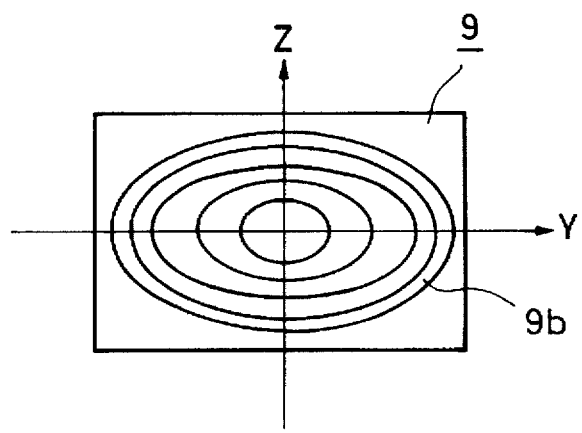

FIGS. 2(a) and 2(b) illustrate a multi-beam scanning optical device embodying a first embodiment of the present invention. This device has a multi-beam scanning optical system consisting of: first and second semiconductor lasers 1 and 2 that are operative to generate laser light beams $L_1$ and $L_2$, which have different wavelengths, for example, 670 nm and 780 nm, respectively; collimator lenses 1a and 2a which are operative to collimate the laser light beams $L_1$ and $L_2$ (namely, convert the laser light beams $L_1$ into parallel beams and similarly convert laser light beams $L_2$ into parallel beams); a beam synthesizer 3, which is operative to synthesize and generate a single synthetic beam $L_0$ from parallelized laser light beams $L_1$ and $L_2$; a cylindrical lens 3a which is operative to condense the synthetic beam $L_0$ in a linear beam on a reflection surface 4a of a rotating polygon mirror 4; and an image formation lens system 6 that is operative to form an image of the synthetic beam $L_0$, which has been deflected and used in scanning by the rotating polygon mirror 4, on the surface of a light-sensitive drum 5 to be used as a recording medium. Further, a beam splitter 7 for splitting the synthetic beam $L_0$ into a scanning light beam $L_3$, whose wavelength is 670 nm, and a scanning light beam $L_4$, whose wavelength is 780 nm, is provided between the light-sensitive drum 5 and the image formation lens system 6. The scanning light beams $L_3$ and $L_4$ obtained by the beam splitter 7 reach corresponding image (formation) points 5a and 5b on the light-sensitive drum 5 through turning mirrors 8a to 8c, respectively. Namely, the first scanning light beam $L_3$ having a wavelength of 670 nm is first transmitted by the beam splitter 7 and is then reflected by the first and second turning mirrors 8a and 8b. Subsequently, an image is formed from the first scanning light beam $L_3$ at the first image (formation) point 5a on the light-sensitive drum 5. On the other hand, the second scanning light beam $L_4$ having a wavelength of 780 nm is first reflected by the beam splitter 7 and is then reflected by the third turning mirror 8c. Subsequently, an image is formed from the second scanning light beam $L_4$ at the second image (formation) point 5b on the light-sensitive drum 5.

Electrostatic latent images are formed on the light-sensitive drum 5 from the first and second scanning light beams $L_3$ and $L_4$, which have reached the first and second image (formation) points 5a and 5b in this way, by utilizing a main (or horizontal) scanning operation in the direction of the Y-axis, which is performed by rotating the rotating polygon mirror 4, and a subsidiary (or vertical) scanning operation in the direction of the Z-axis, which is performed by rotating the light-sensitive drum 5, respectively. The image formation lens system 6 is provided with a spherical lens 6a and a toric lens 6b and has what is called the fθ-function, namely, the function of correcting the unevenness of the scanning speed of the synthetic beam $L_0$ and the distortion of an image of a point.

The beam synthesizer 3 is a dichroic mirror, which is adapted to transmit the first laser light beam $L_1$ having a wavelength of 670 nm and to reflect the second laser light beam $L_2$ having a wavelength of 780 nm. Similarly, a dichroic mirror, which is adapted to transmit the first laser light beam $L_1$ having a wavelength of 670 nm and to reflect the second laser light beam $L_2$ having a wavelength of 780 nm, is used as the beam splitter 7 that is operative to split the synthetic beam $L_0$ into the scanning light beams $L_3$ and $L_4$, which are different in wavelength from each other, once again.

The cylindrical lens 3a and the spherical lens 6a and the toric lens 6b of the image formation lens system 6 have chromatic aberrations by which the refractive indices of these lenses vary with the wavelength of the laser light beam. Thereby, the distances from the surface of the light-sensitive drum to the image (formation) points respectively corresponding to the scanning light beams $L_3$ and $L_4$ are not equal to each other. When the scanning light beams have certain wavelengths, the distances therebetween largely differ from each other. This results in an extremely blurred picture. Thus, a grating lens 9 is provided in the optical path of the synthetic beam $L_0$. Consequently, a correction is made in such a manner as to offset or cancel out the chromatic aberrations of the cylindrical lens $3a$ and the spherical lens $6a$ and the toric lens $6b$ of the image formation lens system 6.

The grating lens 9 is an anamorphic grating lens obtained by attaching a lens pattern $9b$ of an anamorphic diffraction grating, each zone of which has a section shaped like a rectangle or a blaze as illustrated in FIG. $3(a)$ and further has a radius (namely, a major axis) in the direction of the Y-axis (namely, in the main scanning direction), which is different from a radius (namely, a minor axis) in the direction of the Z-axis (namely, in the subsidiary scanning direction) as shown in FIG. $3(b)$, to a surface of a substrate $9a$. Further, the grating lens 9 has an optical characteristic that is a function of the wavelength $\lambda$ of incident light and the focal length corresponding thereto is constant or invariant.

Namely, when two ray bundles, namely, a bundle of light rays having a wavelength $\lambda_1$ and another bundle of light rays having a wavelength $\lambda_2$ are simultaneously incident upon the grating 9, the following relation between focal lengths $f_1$ and $f_2$ respectively corresponding to the two ray bundles is established, so that a chromatic aberration $\Delta f$ occurs in light outputted or emitted from the grating lens 9.

$$f_2 = f_1(\lambda_1/\lambda_2) \quad (1)$$

$$\Delta f = f_1 - f_2 = f_1(1-\lambda_1/\lambda_2) \quad (2)$$

Thus, the device is configured in such a matter that the chromatic aberrations of the cylindrical lens $3a$ and the image format lens system 6 are offset by the chromatic aberration $\Delta f$ caused in output light of the grating lens 9. Thereby, the distances from the surface of the light-sensitive drum 5 to the image (formation) points $5a$ and $5b$, respectively, corresponding to the scanning light beams $L_3$ and $L_4$ can be made to be uniform.

In accordance with this embodiment of the present invention, the chromatic aberrations of the cylindrical lens and the image formation lens system can easily be corrected simply by providing a grating lens in the optical path of a synthetic beam. Consequently, an inexpensive high-performance multi-beam scanning optical device can be realized.

Incidentally, when a chromatic aberration occurring in the main scanning direction is nearly equal to a chromatic aberration occurring in the subsidiary scanning direction, it is preferable to use a grating lens having a circular diffraction grating, each zone of which has a uniform radius, instead of using the anamorphic grating lens shown in FIG. $3(b)$.

Figure 4:
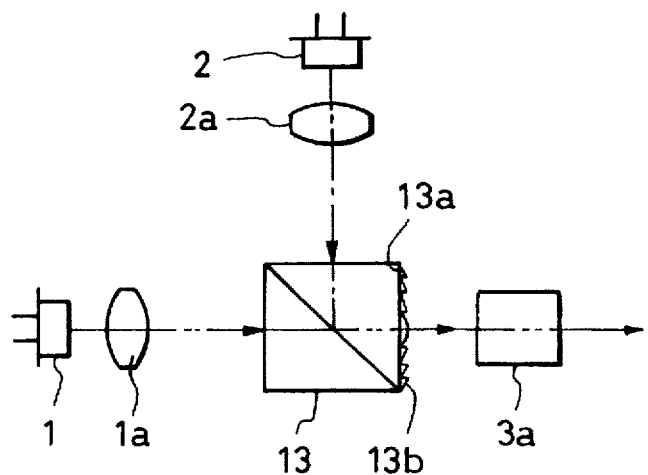
FIG. 4 is a partially schematic plan view of a primary part of a first modification of the first embodiment of the present invention constituting a second embodiment of the present invention.
Figure 5:
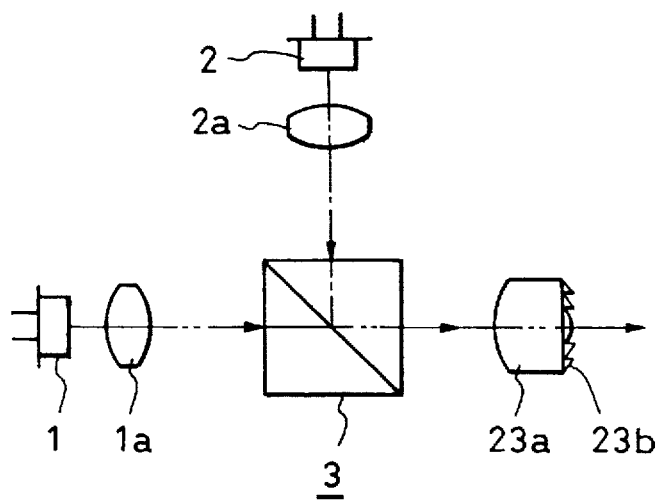
FIG. 5 is a partially schematic plan view of a primary part of a second modification of the first embodiment of the present invention constituting a third embodiment of the present invention.

Moreover, instead of providing a single grating lens in the optical path of a synthetic beam, a lens pattern $13b$ composing a similar grating lens may be attached to the emission (or output) surface $13a$ of a beam synthesizer 13, which is similar to the beam synthesizer 3 of a second embodiment of the present invention shown in FIG. 4. Alternatively, a lens pattern $23b$ composing a similar grating lens may be attached to the emission surface $23a$ of a beam synthesizer $23a$, which is similar to the cylindrical lens $3a$, as in the case of a third embodiment of the present invention shown in FIG. 5.

As compared with the case of providing a single grating lens on the optical path of a synthetic beam, the second and third embodiments have an advantage in that the process of fabricating the device can be simplified by reducing the number of parts or components to be assembled.

The devices of the present invention are constructed as above described. Consequently, the present invention has an advantage in realizing a high-performance inexpensive, multi-beam scanning optical device, which can prevent picture quality from being degraded owing to the chromatic aberration of the cylindrical lens and the image formation lens system.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A multi-beam scanning optical device comprising:

light source means for generating a plurality of light beams having different wavelengths;

beam synthesizing means for synthesizing a synthetic beam from the plurality of light beams;

scanning means for performing scanning by using the synthetic beam;

an optical system for forming an image on a predetermined surface from the synthetic beam; and a grating lens, provided in an optical path of the synthetic beam, for offsetting a chromatic aberration of said optical system.

2. The multi-beam scanning optical device according to claim 1, wherein said grating lens is provided on an emission surface of said beam synthesizing means.

3. The multi-beam scanning optical device according to claim 1, wherein said optical system comprises a cylindrical lens provided in an optical path between said beam synthesizing means and said scanning means, wherein the grating lens is provided on an emission surface of said cylindrical lens.

4. The multi-beam scanning optical device according to claim 1, wherein said grating lens is an anamorphic grating lens that has different focal lengths respectively corresponding to two axes which are orthogonal to each other.

5. A multi-beam scanning optical device comprising:

light source means for generating a plurality of light beams having different wavelengths;

beam synthesizing means for synthesizing a synthetic beam from the plurality of light beams;

scanning means for performing scanning by using the synthetic beam;

a recording medium;

an optical system for forming an image on the recording medium from the synthetic beam; and a grating lens, provided in an optical path of the synthetic beam, for offsetting a chromatic aberration of said optical system.

6. The multi-beam scanning optical device according to claim 5, wherein said grating lens is provided on an emission surface of said beam synthesizing means.

7. The multi-beam scanning optical device according to claim 5, wherein said optical system comprises a cylindrical lens provided in an optical path between the beam synthesizing means and said scanning means, wherein said grating lens is provided on an emission surface of said cylindrical lens.

8. The multi-beam scanning optical device according to claim 5, wherein said grating lens is an anamorphic grating lens that has different focal lengths respectively corresponding to two axes which are orthogonal to each other.

* * * * *